No. 788,575. PATENTED MAY 2, 1905.
W. A. BERNARD.
NIPPERS, PLIERS, OR SIMILAR TOOL.
APPLICATION FILED DEC. 1, 1904.
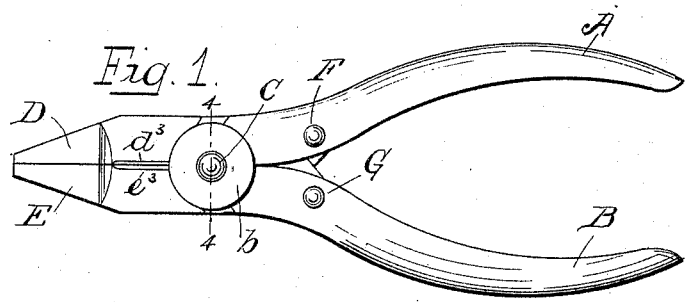
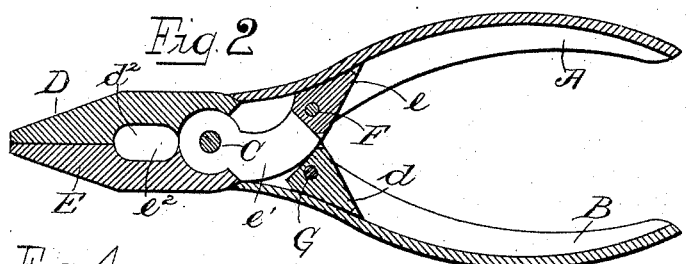
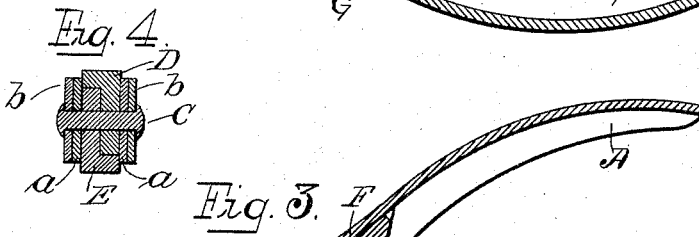
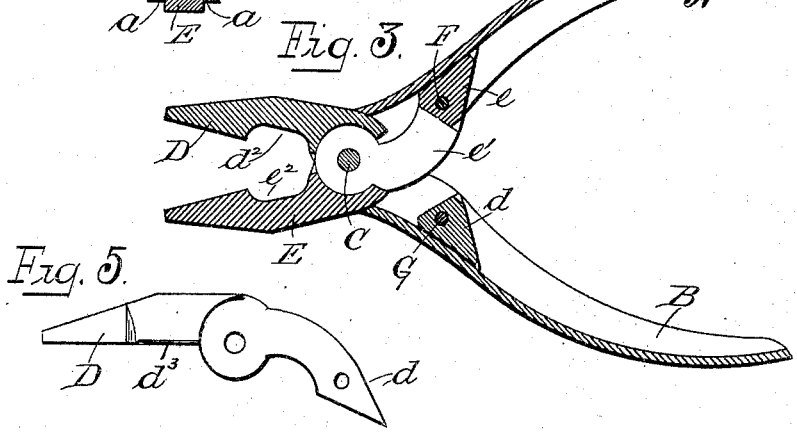
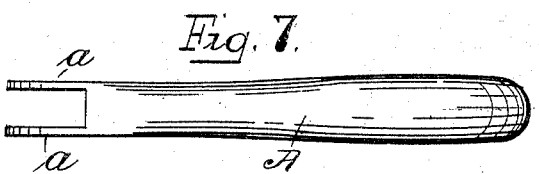
Witnesses
J. S. Coleman
M. Olive Williams
Inventor
William A. Bernard
by Beach & Fisher,
Attorneys No. 788,575.

Patented May 2, 1905.

UNITED STATES PATENT OFFICE.

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

NIPPERS, PLIERS, OR SIMILAR TOOL.

SPECIFICATION forming part of Letters Patent No. 788,575, dated May 2, 1905.

Application filed December 1, 1904. Serial No. 235,053.

*To all whom it may concern:*

Be it known that I, WILLIAM A. BERNARD, of the city and county of New Haven and State of Connecticut, have invented new and useful Improvements in Nippers, Pliers, or Similar Tools, of which the following is a full, clear, and exact description when taken in connection with the accompanying drawings, which form a part thereof, and in which—

Figure 1 represents a side elevation of pliers embodying the invention; Fig. 2, a longitudinal vertical section of the same pliers; Fig. 3, a similar view, the jaws being shown open; Fig. 4, a transverse vertical section on lines 4 4 of Fig. 1; Fig. 5, a detail side view of one of the jaws; Fig. 6, a reverse view of the same jaw, and Fig. 7 a top view of one of the handles.

In all figures similar letters of reference represent like parts.

This invention relates to nippers, pliers, and similar tools, and has for its object the novel construction of the parts whereby they may be assembled more readily and efficiently to form a more durable and effective tool.

To this end the invention consists of certain improvements and combinations of parts more fully set forth and claimed hereinafter.

Referring to the drawings for a more particular description, the parts designated by the letters A and B represent the handles, which are shown formed of sheet metal and stamped up to present an exterior convex surface for a convenient gripping by the operator. The forward ends of the handles are shown bifurcated, and the tines form parallel side plates $a\ a$ and $b\ b$. The tines $b\ b$ are adapted to embrace the tines $a\ a$, (see Fig. 4,) and the fulcrum-pin C is adapted to pivotally connect the tines of the one handle with those of the other.

D and E designate the jaws, which are provided with rearward projections $d$ and $e$, adapted to fit within the hollow interior of the handles B and A. Each of the jaws is cut away at the fulcrum-point and for a short distance to the rear thereof to form recesses $d'$ and $e'$. The recesses $d'$ and $e'$ are on different sides of the two jaws, so that when they are assembled one jaw will fit in the recess of the other, as more clearly shown in Fig. 4. The jaws fit between the inner pair of the parallel side plates $a\ a$ and are pivoted together by the fulcrum-pin C.

F and G designate rivets extending through the handles and the rearward projections $d$ and $e$ of the jaws to secure the rear of the jaws rigidly to the handles. As the rear of the jaw D on one side of the fulcrum extends into the handle B on the opposite side and that of the jaw E into the handle F, the jaws form substantially continuations of the handles beyond the fulcrum C.

In this construction solid jaws and hollow sheet-metal handles may be combined in the same tool and by the peculiar connection produce a fulcrum-joint of great strength, because at the fulcrum both the jaws and the tines of the two handles are connected. As the tines of the handles are on both sides of the jaws and the fulcrum-pin connects the jaws and tines, the tines will prevent any twisting of the jaws such as is likely to occur in the case of ordinary single cross-levers, for the tines of the handles and each jaw form at the fulcrum a mortise for the other jaw. Furthermore, as both sides of each handle overlap its jaw and are connected to it at two points—namely, at the fulcrum and at the rear rivet—any twisting of the handle on the jaw is prevented. In the gripping-face of each jaw, in front of the fulcrum, is shown a transverse recess $d^2$ or $e^2$, extending nearly across the face of the jaw to form at one side of the jaw a thin edge, which is formed into a cutting-blade $d^3$ or $e^3$. As the recesses $d^2$ and $e^2$ and the cutting edges $d^3$ and $e^3$ on the two jaws correspond, a cutting plier or nipper is formed.

Having now described my invention, what I claim, and desire to secure by Letters Patent, is—

1. In nippers, pliers, and similar tools, the combination with handles forked at their forward ends to form parallel plates; of jaws having rearward projections rigidly secured to said handles; and a fulcrum-pin extending through said plates and jaws, substantially as described.

2. In nippers, pliers and similar tools, the combination with hollow handles forked at their forward ends to form parallel plates; of jaws having a pivotal connection with each other, said jaws extending rearward into the hollow interior of said handles and rigidly secured thereon, substantially as described.

3. In nippers, pliers and similar tools, the combination with hollow handles forked at their forward ends to form parallel side plates; of jaws fitting between said side plates, extending rearward into the hollow interior of said handles and rigidly secured therein; and a fulcrum-pin extending through said plates and jaws, substantially as described.

In witness whereof I have hereunto set my hand on the 29th day of November, 1904.

WM. A. BERNARD.

Witnesses:
 JOHN W. BRISTOL,
 SAMUEL H. FISHER.